United States Patent [19]

Charest

[11] Patent Number: 4,843,702
[45] Date of Patent: Jul. 4, 1989

[54] APPARATUS FOR UNCOUPLING THE THREADED CONNECTION OF A PUMP IMPELLER

[76] Inventor: Joseph R. J. L. Charest, 618 Faulker Crescent, Prince George, British Columbia, Canada, V2M 5C6

[21] Appl. No.: 145,505

[22] Filed: Jan. 19, 1988

[30] Foreign Application Priority Data

Sep. 12, 1986 [CA] Canada ................................ 518120

[51] Int. Cl.⁴ ........................................... B23P 19/04
[52] U.S. Cl. ...................................... 29/240; 269/45; 269/296
[58] Field of Search .................. 29/240; 269/17, 45, 269/130, 166, 296; 254/30

[56] References Cited

U.S. PATENT DOCUMENTS

| | | | |
|---|---|---|---|
| 3,256,757 | 6/1966 | Kochaver | 29/240 |
| 3,963,231 | 6/1976 | Cooper | 269/45 |
| 4,092,881 | 6/1978 | Jürgens et al. | 29/240 |
| 4,723,348 | 2/1988 | Jaminet et al. | 29/240 |

*Primary Examiner*—Judy Hartman
*Attorney, Agent, or Firm*—Barrigar & Oyen

[57] ABSTRACT

An apparatus for uncoupling a threaded joint between a pump or turbine shaft and an impeller using the power of a hydraulic cylinder is disclosed. The apparatus has a housing with a V-shaped upper surface for supporting the end of the pump adjacent the impeller, a vertical support for supporting the opposite end of the pump which is adjustable in height and distance from the housing, and a hydraulic cylinder which is pivotally mounted on the side of the housing remote from the support. The rod of the hydraulic cylinder has attached to it a chain and hook for attachment to the impeller blade.

7 Claims, 2 Drawing Sheets

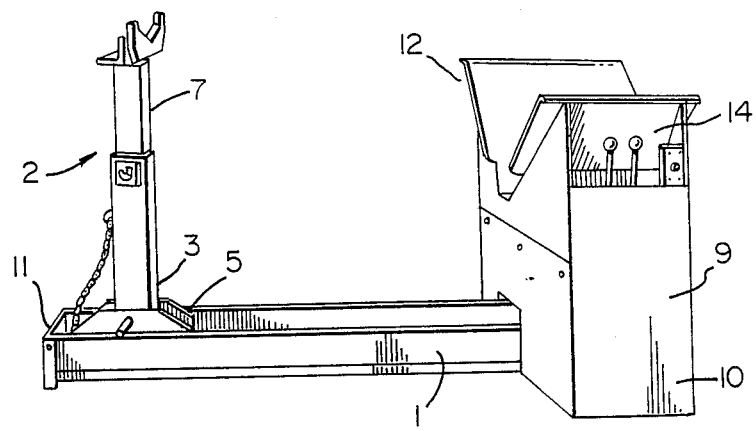
FIG. 1
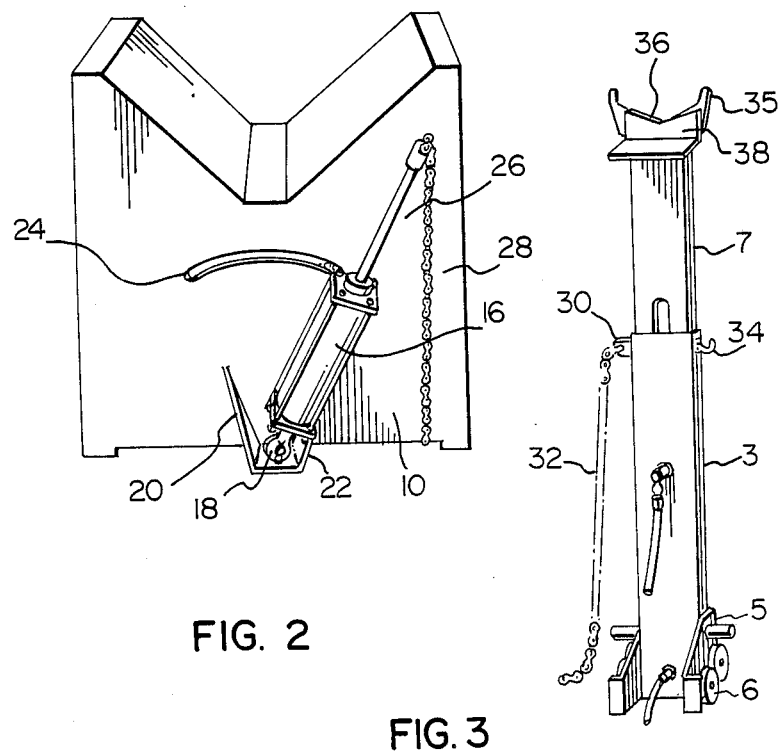
FIG. 2
FIG. 3

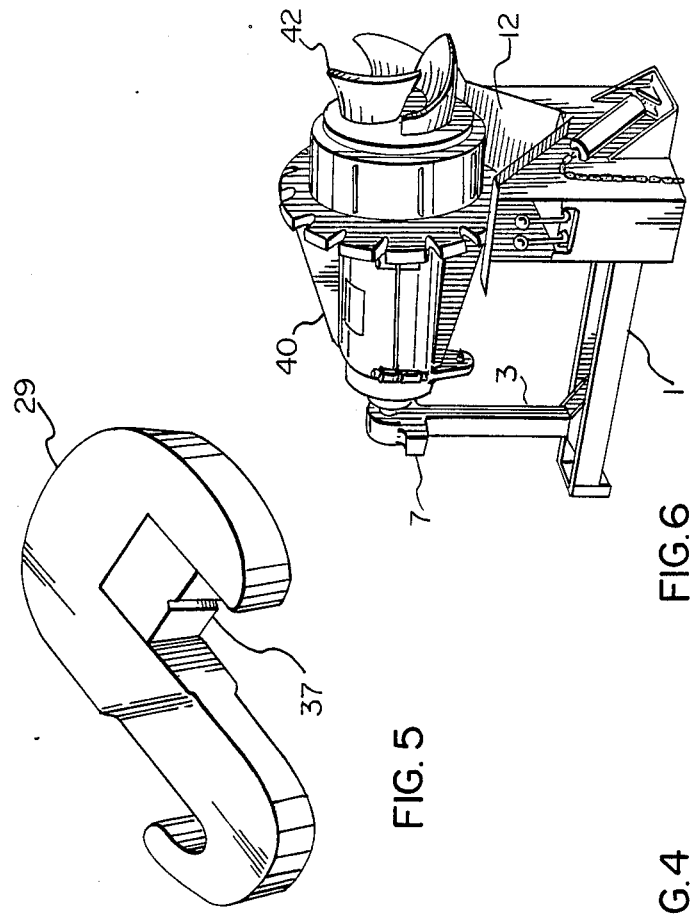
FIG. 6
FIG. 5
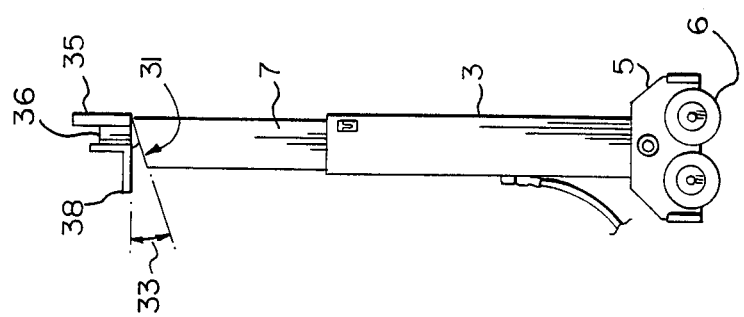
FIG. 4

APPARATUS FOR UNCOUPLING THE THREADED CONNECTION OF A PUMP IMPELLER

BACKGROUND OF THE INVENTION

The invention relates to the general field of power apparatus for uncoupling threaded joints in articles of heavy equipment. More particularly, the invention relates to a hydraulically-powered apparatus for uncoupling the threaded connection of large pump impellers.

Certain items of rotating heavy equipment have threaded connections which tend to tighten as the equipment is operated. For example, the threaded joints in earth drilling equipment become tight during operation and consequently are difficult to disassemble. Similarly, the impellers in large turbine pumps are connected to the lower end of the drive shaft by a threaded coupling which tightens as the pump is operated. Consequently it is difficult to remove the impeller in order to replace it or repair it.

Various power-operated apparatus have been developed to assist in breaking or uncoupling the threaded connections in such heavy equipment. Typically such apparatus are complicated and expensive to operate. For example, U.S. Pat. No. 3,256,757 inventor Kochaver discloses a power wrench for breaking the threaded joints in earth drilling equipment. This device utilizes two pipe wrenches, one anchored to the frame and a second one powered by a hydraulic cylinder. Activation of the cylinder causes one of the wrenches to rotate a portion of the drill pipe in correlation to the anchored portion. Similarly, U.S. Pat. No. 4,092,881 issued June 6, 1978, inventor Jurgens et al., discloses a power apparatus for breaking the threaded connections between drill strings. This device utilizes a stationary chuck and a rotatable chuck, with the structure of the chucks being quite involved. The particular structure for the rotatable chuck is specifically designed for tubular bodies. U.S. Pat. No. 4,295,257 issued Oct. 20, 1981 to Strohs discloses a work stand for supporting and aligning the various components of a vertical turbine pump during assembly or disassembly. The apparatus provides for the power operation of a chain wrench at any location along the work stand, using a hydraulic cylinder to power the chain wrench while a clamp assembly, using a clamping chain and a chain tightener secures the other part of the pump against rotation.

None of these power apparatus is particularly suited for unthreading the impellers of pumps. In particular, none of these apparatus is adapted to break the threaded connection of impellers of various sizes and right or left-threaded connection.

The present invention provides a power apparatus for breaking the threaded connections of various-sized and configured pump impellers. The invention comprises a V-shaped cradle for receiving the housing of the impeller, an upright vise assembly which is vertically adjustable to secure the end of the impeller shaft furthest from the impeller, and a hydraulic cylinder located on the opposite side of the cradle from the vise assembly having its lower end pivotally fixed along the axis of the apparatus and having a chain and hook connected to its upper end for hooking over a blade of the impeller. Activation of the hydraulic cylinder causes torque to be applied to the impeller blade and the threaded connection to be broken.

BRIEF DESCRIPTION OF THE DRAWINGS

FIG. 1 is a side elevation of the apparatus, without an impeller in place;

FIG. 2 is a right end view of the apparatus shown in FIG. 1;

FIG 3 is a left view of the vise and trolley assembly shown in FIG. 1;

FIG. 4 a side view of the vise and trolley assembly shown in FIG. 3;

FIG. 5 is a perspective view of the hook used in the invention; and

FIG. 6 is a perspective view of the apparatus shown in FIG. 1 with an impeller in place.

DETAILED DESCRIPTION OF A PREFERRED EMBODIMENT OF THE INVENTION

Referring to FIG. 1, the apparatus includes a trolley beam 1, constructed for example of four-inch steel channel. Mounted in the trolley beam is a vise and trolley assembly 2, consisting of a trolley assembly 3, carriage assembly 5, and vise assembly 7. The vise and trolley assembly is able to be rolled to any position on the trolley beam by virtue of carriage wheels 6 shown in FIG 4. Trolley stop 11 prevents the carriage from rolling out of the trolley beam and also functions as legs for the trolley beam.

Fixed to the end of the trolley beam opposite from the trolley stop is a work stand or table 9, consisting of a housing 10 and a cradle 12. Housing 10 encloses an electric motor for powering a hydraulic pump, and a reservoir of hydraulic fluid. The pump activates the hydraulic cylinders to be described hereafter, using controls 14, all in a known fashion.

Referring to FIG. 2, hydraulic cylinder 16 is the main cylinder and is used for breaking the threaded coupling. It is pivotally attached to the housing 10 at 18 by means of a pin through the clevis of the cylinder running through an ear attached to the housing and secured by a cotter pin. Stops 20 and 22 limit the extent to which the cylinder is able to pivot. A slot 24 in the housing allows the hydraulic connection to the cylinder 16 to enter the housing at any angle of the cylinder. The cylinder has the usual rod 26 attached to the end of the piston in the cylinder. To the end of the rod is attached a chain 28.

Referring to FIGS. 3 and 4 the vise and trolley assembly consists of the trolley assembly 3 mounted on carriage 5 having four carriage wheels 6. The vise assembly 7 is vertically slideable within the trolley assembly 3 so that the height of the vise may be adjusted. The height may be power-adjusted using a hydraulic cylinder pivotally secured to the base of the trolley assembly with its piston rod attached to the vise assembly. The height of the vise assembly may then be automatically be controlled by controls 14.

The trolley assembly has an eye 30 to which is secured chain 32. On the opposite side of the trolley assembly is fixed a hook 34 for receiving the chain.

The vise assembly consists of a V-shaped vise plate 35 shaped to receive the shaft of the impeller, a V-shaped plate 36 having teeth for gripping the shaft of the pump, and a V-shaped plate 38. An angle 33 of approximately 10° is formed between the upper edge of the shaft 31 which supports the vise assembly and the horizontal. The entire vise assembly, consisting of the vise plate 35, teeth 36 and pivot plate 38 is mounted on a horizontal pivot pin at right angles to the lengthwise direction of the trolley beam which allows the vise assembly to pivot back an angle 10° from the horizontal. This allows the vise assembly to obtain a strong grip on the coupling or shaft despite the fact that the pump rotating assembly may not be perfectly level. Also, it has been found to be preferable to have the pump rotating assembly lower at the end remote from the impeller when breaking the thread in order to diminish the impeller angle on the pulling hook.

The hook 29 used in the apparatus to hook the impeller blade is shown in FIG. 5. In order to protect the blade, a resilient wooden or rubber slotted insert 37 may be used to place over the impeller blade.

In operation, the pump assembly 40 is placed with the impeller blade 42 projecting over the end of cradle 12 as shown in FIG. 6 and the other end of the pump shaft resting on vice assembly 7. The trolley assembly is positioned at the appropriate distance from the work stand or table 9 by rolling it along the trolley beam. The hydraulic cylinder in the vise and trolley assembly is activated to raise or lower the vise assembly until the pump shaft is approximately level. Hold-down chain 32 is then led over the shaft or coupling and hooked onto hook 34. The hydraulic cylinder is then activated to raise the vise assembly and tighten the shaft or coupling against the teeth 36 of the vise assembly.

Main cylinder 16 is pivoted to one side or the other of its range of travel depending on whether the impeller is a right or left-hand thread. The chain is then led over the impeller blade and hook 29 hooked over one of the blades. The cylinder is then activated to tighten the chain and uncouple the threaded coupling.

It will be seen that the invention is particularly adapted for unthreading the threaded connection of an impeller of varying size and shape. The movement of the carriage assembly along the trolley beam and the raising or lowering of the vise assembly shaft allows for adjustment to the various pump assembly sizes. Further, the pivoting capacity of the main cylinder 16 allows it to not only adjust to impellers of various diameters, but also to impellers having right or left-handed threads.

As will be apparent to persons skilled in the art, various modifications and adaptations of the structure above described are possible without departure from the spirit of the invention, the scope of which is defined in the appended claims.

The embodiments of the invention in which an exclusive property or privilege is claimed are defined as follows:

1. An apparatus for uncoupling a threaded joint between a pump or turbine shaft and an impeller, said pump having a first end adjacent said impeller and a second end remote from said impeller, comprising:
    (a) a housing having an upper surface for supporting said end of said pump adjacent said impeller;
    (b) a longitudinal beam secured to said housing;
    (c) a vertically upstanding support mounted on said beam in alignment with said housing and having means for securing said end of said pump remote from said impeller;
    (d) a hydraulic cylinder mounted for pivotal motion about an axis of rotation on a first side of said housing remote from said support, said cylinder having an extendible rod;
    (e) flexible means secured at one end thereof to one end of said rod of said hydraulic cylinder and having hooking means secured to the other end of said flexible means for attachment to a blade of said impeller such that retraction of said rod creates a pulling force on said flexible means and said hook, whereby said hook creates a torsion force on said impeller; and
    (f) motor means connected to said hydraulic cylinder for activating said hydraulic cylinder to tighten said flexible means and apply torque to said blade through said hooking means.

2. The apparatus of claim 1 wherein said support is movable along said longitudinal beam.

3. The apparatus of claim I wherein the height of said support is adjustable.

4. The apparatus of claim 1 wherein said housing further comprises step means to limit the degree of pivoting of said hydraulic cylinder 5. The apparatus of claim 1 wherein said hydraulic cylinder is mounted at a base of said housing with said axis of rotation of said pivotal movement lying along the longitudinal centerline of said longitudinal beam.

6. The apparatus of claim 3 including hydraulic cylinder means on the support for adjusting the height of said support.

7. The apparatus of claim I wherein said means for securing said end of said pump to said vertically upstanding support comprises flexible means having a first end secured to said support and a second end adapted to be removably secured to said support.

* * * * *